US011745590B2

United States Patent

Kawashima

(12) United States Patent
(10) Patent No.: US 11,745,590 B2
(45) Date of Patent: Sep. 5, 2023

(54) VEHICLE INVERTER DEVICE AND VEHICLE FLUID MACHINE

(71) Applicant: KABUSHIKI KAISHA TOYOTA JIDOSHOKKI, Kariya (JP)

(72) Inventor: Takashi Kawashima, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 1 day.

(21) Appl. No.: 17/557,410

(22) Filed: Dec. 21, 2021

(65) Prior Publication Data

US 2022/0203836 A1 Jun. 30, 2022

(30) Foreign Application Priority Data

Dec. 24, 2020 (JP) ................................ 2020-214830

(51) Int. Cl.
*H02P 1/26* (2006.01)
*B60L 3/00* (2019.01)
*H02M 7/5387* (2007.01)

(52) U.S. Cl.
CPC ........... *B60L 3/003* (2013.01); *H02M 7/5387* (2013.01); *B60L 2210/40* (2013.01); *B60L 2240/529* (2013.01)

(58) Field of Classification Search
CPC .......... H02P 27/06; H02P 6/085; H02P 29/50; H02M 7/5387; B60L 3/003; B60L 2210/40; B60L 2240/529
See application file for complete search history.

(56) References Cited

U.S. PATENT DOCUMENTS

2017/0163201 A1 6/2017 Nakamoto et al.

FOREIGN PATENT DOCUMENTS

| | | | |
|---|---|---|---|
| CN | 104081640 A | * 10/2014 | ............. H02M 1/08 |
| JP | 2002-165466 A | 6/2002 | |
| JP | 2004-147390 A | 5/2004 | |
| JP | 2010-057333 A | 3/2010 | |
| JP | 2016-046870 A | 4/2016 | |
| JP | 2017-135897 A | 8/2017 | |

* cited by examiner

*Primary Examiner* — Karen Masih
(74) *Attorney, Agent, or Firm* — Sughrue Mion, PLLC

(57) ABSTRACT

A vehicle inverter device for driving an electric motor using a vehicle electric power source. The vehicle inverter device includes an input terminal, a filter circuit including a capacitor, an inverter circuit, a positive bus bar, a negative bus bar, a control circuit, an upper arm ground line, and a low voltage electric power source circuit. The control circuit causes only a lower arm switching element to be in an on-state and electrically connects the control circuit and the negative bus bar through the upper arm ground line when a direct current electric power is supplied from the low-voltage electric power source circuit under a condition where a direct current electric power is not inputted to the input terminal.

6 Claims, 3 Drawing Sheets

100 111 114 31 60 41 Du1 Lgv1 Dv1 Lgw1 50 30 10 P1 LN11 Qu1 Qv1 Qw1 Dw1 11 24u 104 113 Lgu1 FILTER CIR. LNu LNv LNw 33 24w 24v Du2 Dv2 Qu2 Qv2 Qw2 34 35 112 LN12 115 42 Dw2 32 Lgu2 Lgv2 Lgw2 73 71 VOLTAGE SENSOR DRIVER CIRCUIT 72 COMPRESSOR ECU EL P2 80 LOW-VOLTAGE ELECTRIC POWER SOURCE CIRCUIT 10
30
50
60
71
72
73
80
DRIVER CIRCUIT
COMPRESSOR ECU
LOW-VOLTAGE ELECTRIC POWER SOURCE CIRCUIT
VOLTAGE SENSOR
11
24u
24v
24w
33
34
35
41
42
31
32
100
104
111
112
113
114
115
LN11
LN12
LNu
LNv
LNw
Qu1
Qu2
Qv1
Qv2
Qw1
Qw2
Du1
Du2
Dv1
Dv2
Dw1
Dw2
Lgu1
Lgu2
Lgv1
Lgv2
Lgw1
Lgw2
P1
P2
EL

VOLTAGE SENSOR
DRIVER CIRCUIT
COMPRESSOR ECU
LOW-VOLTAGE ELECTRIC POWER SOURCE CIRCUIT
Ir (Qu2:OFF)
Ir (Qu2:ON)
Ir
Qu1
Qu2
Du1
Du2
LNu
Lgu1
Lgu2
LN11
LN12
EL
P1
P2
10
30
41
42
50
60
61
62
63
71
71a
72
73
80
91
92
31
32
100
104
111
112
113
114
115

VEHICLE INVERTER DEVICE AND VEHICLE FLUID MACHINE

CROSS-REFERENCE TO RELATED APPLICATION

This application claims priority to Japanese Patent Application No. 2020-214830 filed on Dec. 24, 2020, the entire disclosure of which is incorporated herein by reference.

BACKGROUND ART

The present disclosure relates to a vehicle inverter device and a vehicle fluid machine.

For example, as disclosed in Japanese Patent Application Publication No. 2016-046870, there is known a vehicle inverter device converting a DC electric power to an AC electric power using a vehicle power supply source. The vehicle inverter device of the Publication includes an inverter circuit, a smoothing capacitor as a capacitor for a filter circuit disposed between the inverter circuit and a high-voltage electric power source as a vehicle power source, a relay disposed between the smoothing capacitor and the high-voltage electric power source, and a control device as a control circuit.

The inventors of the present disclosure have found out that the capacitor of the filter circuit disposed in the vehicle inverter device is charged in some cases before the relay for supplying a DC electric power from the vehicle power source to the vehicle inverter device is switched to an on-state. In addition, the inventors of the present disclosure have found out that an operation of the relay may be hindered if the relay is switched to the on-state with the capacitor of the filter circuit charged.

The present disclosure has been made in view of the above-described circumstance, and is directed to providing a vehicle inverter device and a vehicle fluid machine provided with such a vehicle inverter device that can suppress switching the relays to an on-state with a capacitor of a filter circuit charged.

SUMMARY

In accordance with an aspect of the present disclosure, there is provided a vehicle inverter device configured for driving an electric motor using a vehicle electric power source. The vehicle inverter device includes an input terminal connected to the vehicle electric power source via a relay, a filter circuit configured to reduce a noise contained in a direct current electric power inputted from the input terminal, an inverter circuit including an upper arm switching element and a lower arm switching element connected in series to each other through a connection line, and configured to converts the direct current electric power inputted from the filter circuit to an alternating current electric power, a positive bus bar electrically connecting the input terminal, the capacitor, and the upper arm switching element, a negative bus bar electrically connecting the input terminal, the capacitor, and the lower arm switching element, a control circuit configured to control the upper arm switching element and the lower arm switching element, an upper arm ground line connecting the control circuit and the connection line, and a low-voltage electric power source circuit configured to supply the direct current electric power to the control circuit, not though the relay and the input terminal. The control circuit is configured to cause only the lower arm switching element to be in an on-state and electrically connects the control circuit and the negative bus bar through the upper arm ground line when the direct current electric power is supplied from the low-voltage electric power source circuit under a condition that the direct current electric power is not inputted to the input terminal.

In accordance with another aspect of the present disclosure, there is provided a vehicle fluid machine including the vehicle electric motor, and the vehicle inverter device.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe a vehicle inverter device and a vehicle fluid machine provided with the inverter device according to an embodiment of the present disclosure. It is noted that the following description is to be considered only as an example, and the inverter device and the vehicle fluid machine are not limited to an aspect of the present embodiment.

In the present embodiment, the vehicle fluid machine is a vehicle electric compressor that is used in a vehicle air conditioner. The following will describe a schematic configuration of the vehicle air conditioner and the vehicle electric compressor.

Figure 1:
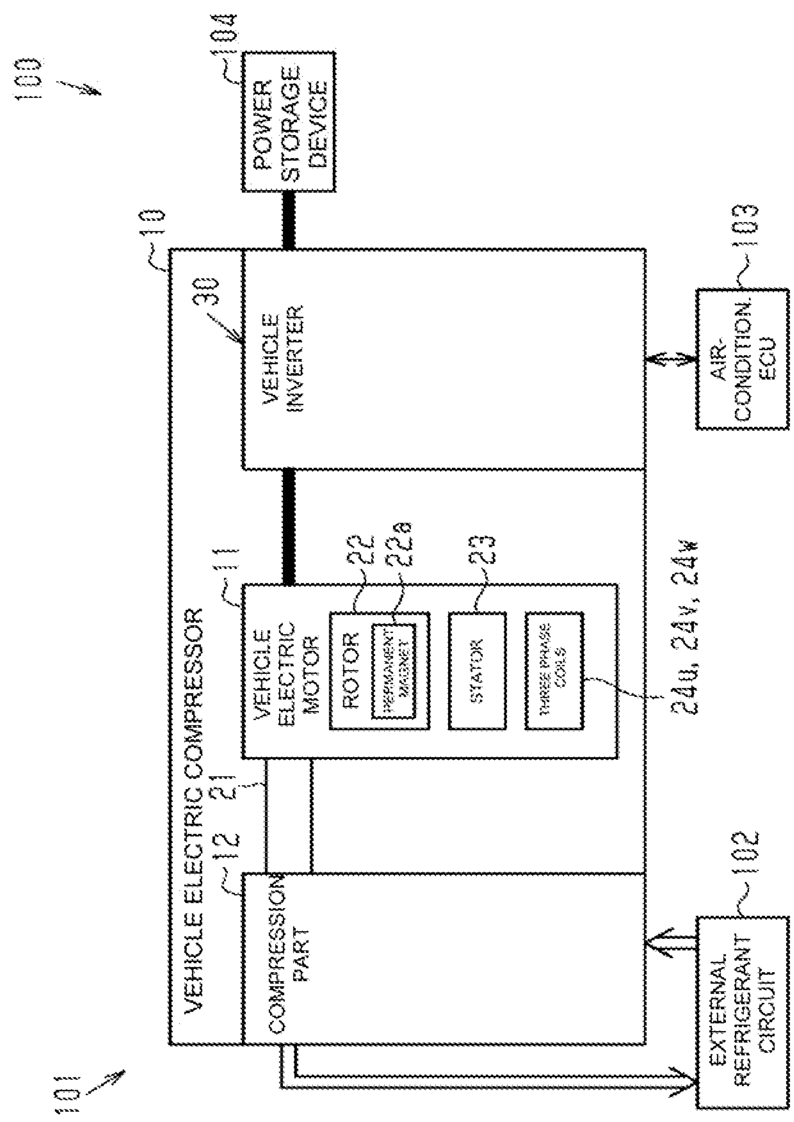
FIG. 1 is a block diagram schematically illustrating a vehicle electric compressor according to the present disclosure.

As illustrated in FIG. 1, a vehicle air conditioner 101 is mounted on a vehicle 100, and includes a vehicle electric compressor 10 and an external refrigerant circuit 102 through which refrigerant as fluid is supplied to the vehicle electric compressor 10.

The external refrigerant circuit 102 includes, for example, a heat exchanger and an expansion valve. The vehicle electric compressor 10 compresses the refrigerant, and heat exchange and expansion of the refrigerant are performed in the external refrigerant circuit 102. This allows the vehicle air conditioner 101 to cool and warm a passenger compartment.

The vehicle air conditioner 101 includes an air-conditioning ECU 103 that controls the entire vehicle air conditioner 101. The air-conditioning ECU 103 is configured to obtain a temperature inside the passenger compartment, a setting temperature of an automotive air conditioner, and the like, and transmits various commands such as a command rotational speed to the vehicle electric compressor 10 based on the obtained these parameters.

The vehicle 100 includes a power storage device 104 as a vehicle power source. Any type of a power storage device may be used for the power storage device 104 as long as the power storage device is capable of charging and discharging a DC electric power. For example, a secondary battery or an electric double-layer capacitor may be used. The power storage device 104 is configured to output a high DC electric power P1. The high DC electric power P1 corresponds to a discharge electric power of the power storage device 104.

The vehicle electric compressor 10 includes a vehicle electric motor 11, a compression part 12 that is driven by the vehicle electric motor 11, and a vehicle inverter device 30 that drives the vehicle electric motor 11 by using the DC electric power supply from the power storage device 104.

Figure 2:
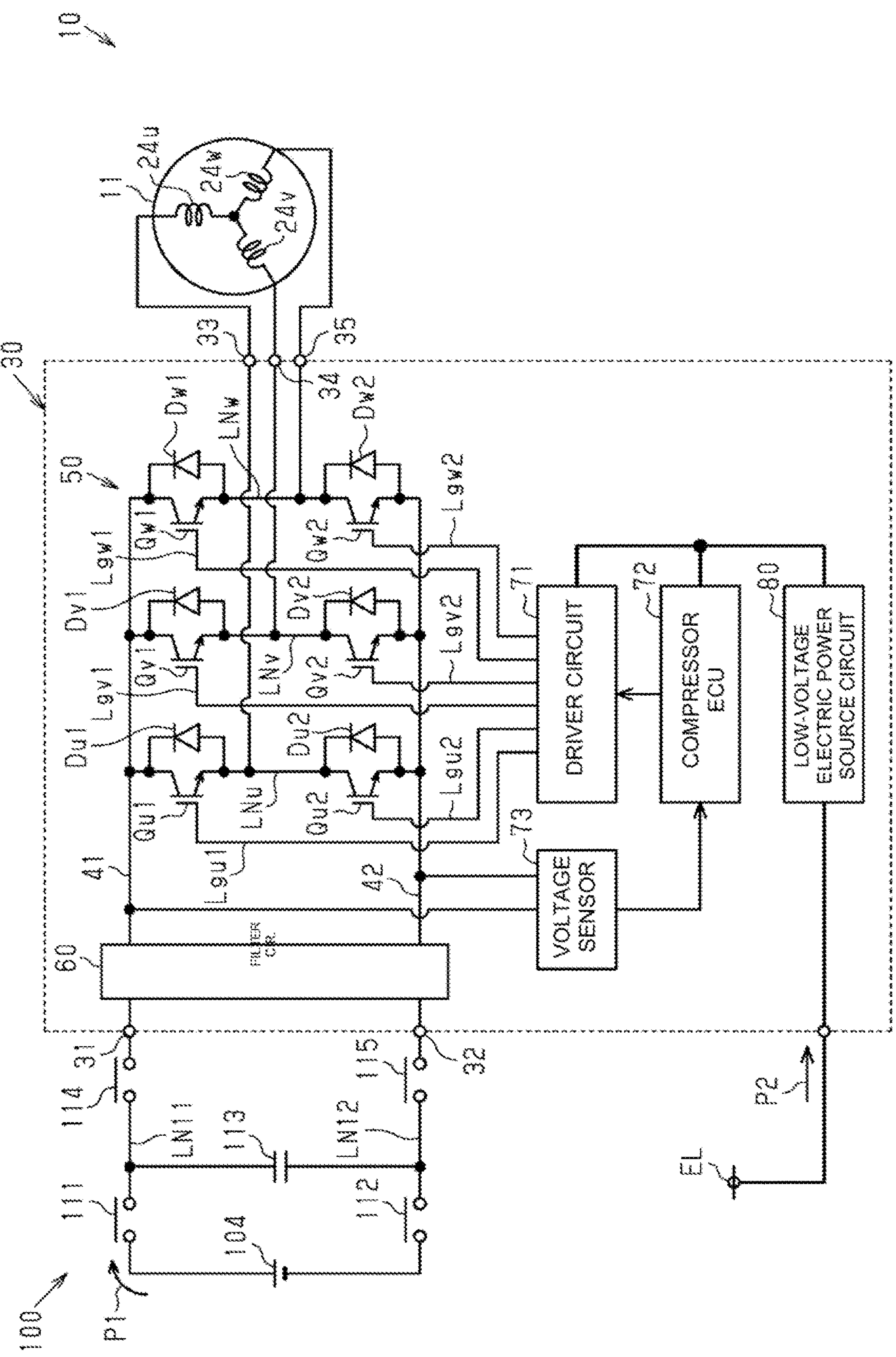
FIG. 2 is a block diagram illustrating an electrical configuration of a vehicle inverter device according to the present disclosure.

The vehicle electric motor 11 includes a rotary shaft 21, a rotor 22 fixed to the rotary shaft 21, a stator 23 that is positioned so as to face the rotor 22, and three-phase coils 24*u*, 24*v*, 24*w* wound around the stator 23. The rotor 22 has permanent magnets 22*a*. In detail, the permanent magnets 22*a* are embedded in the rotor 22. As illustrated in FIG. 2, the three-phase coils 24*u*, 24*v*, 24*w* are Y-connected, for example. The three-phase coils 24*u*, 24*v*, 24*w* are sequentially energized in a predetermined pattern, thereby rotating the rotor 22 and the rotary shaft 21. That is, the vehicle electric motor 11 of the present embodiment is a three-phase motor.

It is noted that a wire connection of the three-phase coils 24*u*, 24*v*, 24*w* is not limited to the Y-connection, and may be, for example, a delta-connection. Here, a rotational speed and an acceleration of the vehicle electric motor 11 correspond to a rotational speed and an acceleration of the rotor 22.

The compression part 12 is configured to compress fluid (i.e., refrigerant in the present embodiment) by the driving of the vehicle electric motor 11. Specifically, the compression part 12 compresses the refrigerant drawn from the external refrigerant circuit 102 and discharges the compressed refrigerant with the rotation of the rotary shaft 21. A specific configuration of the compression part 12 may be of a scroll type, a piston type, a vane type, or the like, and selected as desired.

As illustrated in FIG. 2, the vehicle inverter device 30 includes input terminals 31, 32, and output terminals 33, 34, 35. The input terminals 31, 32 are used for connecting the vehicle inverter device 30 and the power storage device 104. In the present embodiment, the input terminals 31, 32 are connected to the power storage device 104 via relays 111, 112, 114, 115. In detail, the vehicle 100 includes first and second power lines LN11, LN12 connecting the input terminals 31, 32 and the power storage device 104. The relays 111, 114 are disposed on the first power line LN11. The relays 112, 115 are disposed on the second power line LN12. In the present embodiment, the relays 111, 112, 114, 115 are provided outside the vehicle inverter device 30.

According to this configuration, when the relays 111, 112, 114, 115 are in an on-state, the high DC electric power P1 outputted from the power storage device 104 is inputted to the input terminals 31, 32. On the other hand, when the relays 111, 112, 114, 115 are in an off-state, the high DC electric power P1 is not inputted to the input terminals 31, 32. In the present embodiment, the relays 111, 112, 114, 115 are initially in the off-state.

In the present embodiment, the vehicle 100 includes a smoothing capacitor 113 connected to the power storage device 104. The smoothing capacitor 113 is connected to both of the first power line LN11 and the second power line LN12. The smoothing capacitor 113 is disposed between the relays 111, 112 and the relays 114, 115. In this case, it can also be said that the relays 111, 112 are disposed between the power storage device 104 and the smoothing capacitor 113, and the relays 114, 115 are disposed between the smoothing capacitor 113 and the input terminals 31, 32. For the sake of description, the relays 111 112 may be referred to as the main relays 111, 112, and the relays 114, 115 may be referred to as the sub-relays 114, 115 in the following description.

The output terminals 33, 34, 35 are used to connect the vehicle inverter device 30 and the vehicle electric motor 11. In the present embodiment, the output terminals 33, 34, 35 are connected to the three-phase coils 24*u*, 24*v*, 24*w* of the vehicle electric motor 11, respectively.

The vehicle inverter device 30 converts the high DC electric power P1 inputted from the input terminals 31, 32 to an AC electric power, and outputs the converted AC electric power from the output terminals 33, 34, 35, thereby driving the vehicle electric motor 11 using the power storage device 104.

As illustrated in FIGS. 1 and 2, the vehicle inverter device 30 includes a positive bus bar 41, a negative bus bar 42, an inverter circuit 50, a filter circuit 60, a driver circuit 71 and a compressor ECU 72. The driver circuit 71 and the compressor ECU 72 correspond to a control circuit controlling the inverter circuit 50.

As illustrated in FIG. 2, the positive bus bar 41 is connected to the first input terminal 31. The positive bus bar 41 is connected to a positive terminal (+terminal) of the power storage device 104 via the first input terminal 31, the first sub-relay 114, and the first main relay 111. The negative bus bar 42 is connected to the second input terminal 32. The negative bus bar 42 is connected to a negative terminal (−terminal) of the power storage device 104 via the second input terminal 32 the second sub-relay 115, and the second main relay 112.

The inverter circuit 50 has three-phase switching elements Qu1, Qu2, Qv1, Qv2, Qw1, Qw2. In detail, the inverter circuit 50 has the u-phase switching elements Qu1, Qu2 corresponding to the u-phase coil 24*u*, the v-phase switching elements Qv1, Qv2 corresponding to the v-phase coil 24*v*, and the w-phase switching elements Qw1, Qw2 corresponding to the w-phase coil 24*w*.

The three-phase switching elements Qu1 to Qw2 are power switching elements such as IGBTs. The three-phase switching elements Qu1 to Qw2 each include a gate terminal as a control terminal, and collector and emitter terminals though which an inverter current flows. The inverter current is an electric current flowing through the three-phase coils 24*u*, 24*v*, 24*w*. In addition, the three-phase switching elements Qu1, Qu2, Qv1, Qv2, Qw1, Qw2 are connected in parallel with freewheeling diodes Du1, Du2, Dv1, Dv2, Dw1, Dw2, respectively.

The three-phase switching elements Qu1 to Qw2 are not limited to the IGBTs, and may be MOSFETs, or the like. In such a case, body diodes of the three-phase switching elements Qu1 to Qw2 may serve as the freewheeling diodes Du1 to Dw2.

The u-phase switching elements Qu1, Qu2 are connected in series with each other via a u-phase connection line LNu. The u-phase connection line LNu is connected to the u-phase coil 24*u* via the u-phase output terminal 33.

The u-phase upper arm switching element Qu1 is connected to the positive bus bar 41, and the u-phase lower arm switching element Qu2 is connected to the negative bus bar 42. In detail, a collector terminal of the u-phase upper arm switching element Qu1 is connected to the positive bus bar 41, and an emitter terminal of the u-phase lower arm switching element Qu2 is connected to the negative bus bar 42.

The u-phase upper arm freewheeling diode Dul has an anode connected to the u-phase connection line LNu and a cathode connected to the positive bus bar 41. The u-phase lower arm freewheeling diode Dug has an anode connected to the negative bus bar 42 and a cathode connected to the u-phase connection line LNu.

The three-phase switching elements Qv1, Qv2, Qw1, Qw2 are connected in the same way as the u-phase switching elements Qu1, Qu2, excluding that the respective corresponding output terminals are not the u-phase coil 24*u*. That is, the v-phase upper arm switching element Qv1 and the v-phase lower arm switching element Qv2 are connected in series to each other through the v-phase connection line LNv, and the w-phase upper arm switching element Qw1 and the w-phase lower arm switching element Qw2 are connected in series to each other through the w-phase connection line Lnw.

As illustrated in FIG. 2, the filter circuit 60 is disposed between the input terminals 31, 32 and the inverter circuit 50. The filter circuit 60 reduces noise contained in the high DC electric power P1 inputted from the input terminals 31, 32. Thus, the DC electric power whose is reduced by the filter circuit 60 is inputted to the inverter circuit 50. Then, the inverter circuit 50 converts the DC electric power inputted from the filter circuit 60 into the AC electric power.

The filter circuit 60 is provided with a common mode coil 61 that is provided on the bus bars 41, 42, a normal mode coil 62 that is provided on at least one of the positive bus bar 41 and the negative bus bar 42 (on the positive bus bar 41 in the present embodiment), and a filter capacitor 63. In the present embodiment, the filter capacitor 63 corresponds to a capacitor of the filter circuit.

The filter capacitor 63 is connected to the inverter circuit 50 (specifically, the three-phase switching elements Qu1 to QW2), for example, via the bus bars 41, 42, and to the input terminals 31, 32.

In the present embodiment, the normal mode coil 62 and the filter capacitor 63 form a low pass filter circuit. That is, the filter circuit 60 of the present embodiment has the low pass filter circuit including the normal mode coil 62 and the filter capacitor 63. The filter capacitor 63 of the present embodiment may be called as an X capacitor.

It is noted that a capacitance of the filter capacitor 63 of the present embodiment is set so that resonance frequency of the low pass filter circuit becomes a desired value and the voltage of the high DC electric power P1 can be stabilized. However, the capacitance of the filter capacitor 63 is not limited thereto, but may be set arbitrarily.

The capacitance of the filter capacitor 63 may be smaller or greater than that of the smoothing capacitor 113. The capacitances of the filter capacitor 63 and the smoothing capacitor 113 may be the same.

The driver circuit 71 is, for example, a circuit having an IC and switching elements. The driver circuit 71 is configured to operate with a supply of a low DC electric power P2, the voltage of which is lower than that of the high DC electric power P1. The driver circuit 71 drives the three-phase switching elements Qu1 to Qw2 individually in response to a command from the compressor ECU 72. The high DC electric power P1 corresponds to the DC electric power having a first voltage, and the low DC electric power P2 corresponds to the DC electric power having a second voltage lower than the first voltage.

In detail, the vehicle inverter device 30 has gate lines Lgu1, Lgu2, Lgv1, Lgv2 Lgw1, Lgw2 connecting their associated gate terminals of the three-phase switching elements Qu1 to Qw2 and the driver circuit 71. The driver circuit 71 applies gate voltage to the gate terminals of the three-phase switching elements Qu1 to Qw2 through the gate lines Lgu1 to Lgw2 to drive the three-phase switching elements Qu1 to Qw2 individually.

The compressor ECU 72 is a controller that has electronic components such as a CPU and a memory. The compressor ECU 72 controls the driver circuit 71 by outputting various commands to the driver circuit 71. The compressor ECU 72 only need be configured with at least one of one or more dedicated hardware circuits and one or more processors (circuits) operable in accordance with a computer program (software).

The vehicle inverter device 30 includes a voltage sensor 73 configured to detect DC electric power inputted to the input terminals 31, 32. The voltage sensor 73 detects whether or not the high DC electric power P1 is inputted to the input terminals 31, 32 by detecting the voltage applied to the bus bars 41, 42. The voltage sensor 73 outputs a result of detection of the voltage applied to the bus bars 41, 42 to the compressor ECU 72. This allows the compressor ECU 72 to determine whether or not the high DC electric power P1 is inputted from the input terminals 31, 32.

The compressor ECU 72 is a circuit configured to operate with a supply of the low DC electric power P2. The compressor ECU 72 performs PWM control on the inverter circuit 50 based on an external command value sent from the air-conditioning ECU 103 as an external member and a rotational speed of the vehicle electric motor 11 to execute rotational control of the vehicle electric motor 11.

In detail, the compressor ECU 72 generates PWM signals for the three-phase switching elements Qu1 to Qw2, and outputs such PWM signals to the driver circuit 71. The driver circuit 71 generates gate voltage for the three-phase switching elements Qu1 to Qw2 based on the PWM signals inputted from the compressor ECU 72, and outputs the gate voltage through the gate lines Lgu1 to Lgw2, thereby periodically switching on and off the three-phase switching elements Qu1 to Qw2.

Figure 3:
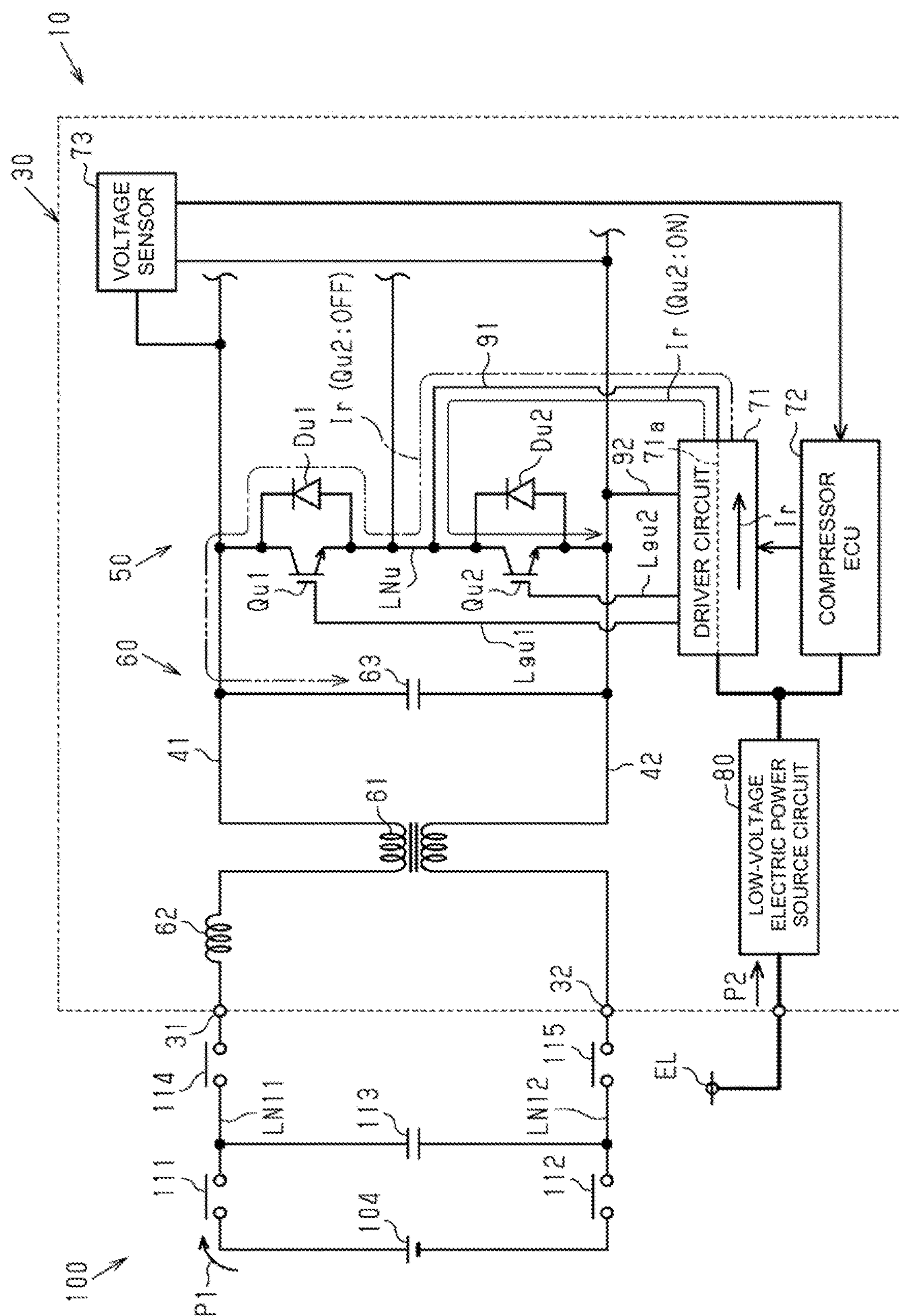
FIG. 3 is a circuit diagram for describing a filter circuit and inverter circuit, as well as a flow of leakage current.

As illustrated in FIGS. 2 and 3, the vehicle inverter device 30 is provided with a low-voltage electric power source circuit 80 configured to supply the low DC electric power P2 to the driver circuit 71 and the compressor ECU 72 as the control circuit, not through the relays 111, 112, 114, 115 and the input terminals 31, 32.

The low-voltage power source circuit 80 is connected to a low-voltage electric power source EL mounted on the vehicle 100, not through the relays 111, 112, 114, 115 and the input terminals 31, 32. The low-voltage power source circuit 80 supplies the low DC electric power P2 to the driver circuit 71 and the compressor ECU 72 with the low DC electric power P2 supplied from the low-voltage electric power source EL. Accordingly, the driver circuit 71 and the compressor ECU 72 are operated. In other words, the driver circuit 71 and the compressor ECU 72 are switched to an operational state (active state) from a stopped state with supply of the low DC electric power P2.

A timing when the low DC electric power P2 is supplied from the low-voltage electric power source EL may be set arbitrarily, and may be a timing when the vehicle 100 is activated, or when the vehicle air conditioner is activated.

Here, a leak current Ir flowing between the driver circuit 71 and the inverter circuit 50 will be described with reference to FIG. 3. For the sake of description, only the u-phase upper arm switching element Qu1 and the u-phase lower arm switching element Qu2 are illustrated in FIG. 3, and the switching elements of the other phases are not illustrated.

As illustrated in FIG. 3, the vehicle inverter device 30 includes an upper arm ground line 91 and a lower arm ground line 92, in addition to the gate lines Lgu1 to Lgw2, as lines connecting the driver circuit 71 and the inverter circuit 50.

The upper arm ground line 91 is a line connecting the u-phase connection line LNu and the driver circuit 71. The driver circuit 71 drives the u-phase upper arm switching element Qu1 by outputting an electric potential higher than an electric potential inputted to the upper arm ground line 91 to the u-phase upper arm gate line Lgu1.

The lower arm ground line 92 is a line connecting the negative bus bar 42 and the driver circuit 71. The driver circuit 71 drives the u-phase lower arm switching element Qu2 by outputting an electric potential higher than an electric potential inputted to the lower arm ground line 92 to the u-phase gate lower arm gate line Lgu2.

As illustrated in FIG. 3, a leakage current Ir may flow in the driver circuit 71 when the low DC electric power P2 is supplied to the driver circuit 71. For example, a leak path 71*a* may be formed in the driver circuit 71. The leak path 71*a* connects a terminal to be supplied with the low DC electric power P2 and a terminal to be connected to the upper arm ground line 91 via an element such as a switching element, in this case, the leakage current Ir flows through the leak path 71*a* to the upper arm ground line 91.

Here, if both of the u-phase switching elements Qu1, Qu2 are in the off-state, the leakage current Ir having flowed through the upper arm ground line 91 may flow towards the u-phase upper arm freewheeling diode Du1, the positive bus bar 41, and the filter capacitor 63, as indicated by the double dotted line in FIG. 3. As a result, the filter capacitor 63 may be charged. When the filter capacitor 63 is charged, voltage is generated between the input terminals 31, 32.

In such a case, that is, when the relays 111, 112, 114, 115 are switched from the off-state to the on-state with the filter capacitor 63 charged, the operations of the relays 111, 112, 114, 115 may be hindered depending on various conditions such as a connection and an order of switching operation of the relays 111, 112, 114, 115. For example, when the sub-relays 114, 115 are switched from the off-state to the on-state under the condition that the main relays 111, 112 are in the off-states, spark may occur at least one of the sub-relays 114, 115.

On the other hand, the vehicle inverter device 30 of the present embodiment is configured such that the filter capacitor 63 is not charged with the leakage current Ir. The following will describe this point in detail.

The compressor ECU 72 starts operating with supply of the low DC electric power P2, and then determines whether or not the high DC electric power P1 is inputted to the input terminals 31, 32 of the vehicle inverter device 30 based on the result of detection by the voltage sensor 73.

When the compressor ECU 72 determines that the high DC electric power P1 is not inputted to the input terminals 31, 32, the compressor ECU 72 outputs a command to set the u-phase lower arm switching element Qu2 in the on-state, to the driver circuit 71. The driver circuit 71 causes the u-phase lower arm switching element Qu2 to be in the on-state in response to the command.

That is, the vehicle inverter device 30 of the present embodiment causes only the u-phase lower arm switching element Qu2 to be in the on-state and electrically connects the driver circuit 71 and the negative bus bar 42 through the upper arm ground line 91 when the low DC electric power P2 is supplied to the driver circuit 71 under a condition where the high DC electric power P1 is not inputted to the input terminals 31, 32.

Then, based on the detection of the high DC electric power P1 by the voltage sensor 73, the compressor ECU 72 outputs a command to set the u-phase lower arm switching element Qu2 in the off-state, to the driver circuit 71. The driver circuit 71 causes the u-phase lower arm switching element Qu2 to be switched from the on-state to the off-state in response to the command. That is, the driver circuit 71 and the compressor ECU 72 of the present embodiment cause the u-phase lower arm switching element Qu2 to be switched from the on-state to the off-state in response to input of the high DC electric power P1 to the input terminals 31, 32. The compressor ECU 72 starts control (PWM control) to drive the vehicle electric motor 11 based on the command from the air-conditioning ECU 103.

Similarly to u-phase upper arm ground line, the vehicle inverter device 30 has an upper arm ground line connecting the driver circuit 71 and the v-phase connection line LNv, and an upper arm ground line connecting the driver circuit 71 and the w-phase connection line LNw. The driver circuit 71 and the compressor ECU 72 control the v-phase switching elements Qv1, Qv2 and the w-phase switching elements Qw1, Qw2, similarly to the u-phase switching elements Qu1, Qu2. That is, the driver circuit 71 and the compressor ECU 72 cause the lower arm switching elements Qu2, Qv2, Qw2 to be in the on-state when the low DC electric power P2 is supplied from the low-voltage electric power source circuit 80 under the condition where the high DC electric power P1 is not supplied to the input terminals 31, 32.

The following will describe an operation of the present embodiment.

When the low DC electric power P2 is supplied to the driver circuit 71 under the condition where the high DC electric power P1 is not supplied to the input terminals 31, 32, the u-phase lower arm switching element Qu2 is switched to the on-state. This causes the leakage current Ir to flow through not the u-phase upper arm freewheeling diode Dul but the u-phase lower arm switching element Qu2, thereby preventing the leakage current Ir from flowing to the filter capacitor 63, as indicated by the solid line in FIG. 3. The same applies to the v-phase and the w-phase. Therefore, the filter capacitor 63 is less likely to be charged with the leakage current Ir.

The above-described present embodiment offers the following effects.

(1) The vehicle inverter device 30 drives the vehicle electric motor 11 using the power storage device 104 as the vehicle power source. The vehicle inverter device 30 includes the input terminals 31, 32, the inverter circuit 50, the filter circuit 60, the driver circuit 71, and the compressor ECU 72. The driver circuit 71 and the compressor ECU 72 serves as the control circuit.

The input terminals 31, 32 are connected to the power storage device 104 via the relays 111, 112, 114, 115. The filter circuit 60 is a circuit configured to reduce the noise of the DC electric power (specifically, the high DC electric power P1) inputted from the input terminals 31, 32, and includes the filter capacitor 63. The inverter circuit 50 includes the upper arm switching elements Qu1, Qv1, Qw1 connected to their associated lower arm switching elements connection line through the connection lines LNu, LNv, LNw, respectively, and converts the high DC electric power P1 inputted from the filter circuit 60 to the AC electric power. The driver circuit 71 and the compressor ECU 72 control the three-phase switching elements Qu1 to Qw2.

The vehicle inverter device 30 includes the upper arm ground line 91 that connects the driver circuit 71 as the control circuit and the u-phase connection line LNu. The vehicle inverter device 30 includes the low-voltage power source circuit 80 that supplies the low DC electric power P2 to the driver circuit 71 and the compressor ECU 72, not through the relays 111, 112, 114, 115 and the input terminals 31, 32.

In this configuration, the driver circuit 71 and the compressor ECU 72 cause the lower arm switching elements Qu2, Qv2, Qw2 to be in the on-state when the low DC electric power P2 is supplied from the low-voltage power source circuit 80 under the condition where the high DC electric power P1 in not inputted to the input terminals 31, 32.

According to this configuration, the lower arm switching elements Qu2, Qv2, Qw2 are in the on-states when the low DC electric power P2 is supplied to the driver circuit 71 under the condition where the high DC electric power P1 is not inputted to the input terminals 31, 32. This suppresses the charging of the filter capacitor 63 with the leakage current Ir leaked from the driver circuit 71. As a result, switching of the relays 111, 112, 114, 115 to the on-state with the filter capacitor 63 charged is suppressed.

It is noted that the switching of the relays 111, 112, 114, 115 to the on-state includes a case where the relays 111, 112, 1'14, 115 are switched to the on-state in a predetermined order, and a case where at least two of the relays 111, 112, 114, 115 are switched to the on-state at the same time.

(2) The driver circuit 71 and the compressor ECU 72 cause the lower arm switching elements Qu2, Qv2, Qw2 to be switched from the on-state to the off-state in response to the input of the high DC electric power P1 to the input terminals 31, 32.

According to this configuration, the lower arm switching elements Qu2, Qv2, Qw2 are in the off-state when the high DC electric power P1 is supplied to the input terminals 31, 32 with the relays 111, 112, 114, 115 in the on-state. This may avoid starting the control of the vehicle electric motor 11 (specifically, the PWM control) while the lower arm switching elements Qu2, Qv2, Qw2 are in the on-state, so that the control of the vehicle electric motor 11 may be started smoothly. After the relays 111, 112, 114, 115 are switched to the on-state, the operations of the relays 111, 112, 114, 115 are less likely to be hindered even if the filter capacitor 63 is charged. Thus, the control of the vehicle electric motor 11 may be started smoothly while suppressing the effect on the relays 111, 112, 114, 115.

(3) The filter circuit 60 includes the normal mode coil 62 as the coil. The filter circuit 60 has the low pass filter circuit including the normal mode coil 62 and the filter capacitor 63.

In this configuration, the normal mode noise included in the high DC electric power P1 to be inputted to the input terminals 31, 32 may be reduced. In some cases, the capacitance of the filter capacitor 63 is set so that resonance frequency of the low pass filter circuit can be adjusted or the voltage of the high DC electric power P1 can be stabilized. In this case, depending on the capacitance of the filter capacitor 63, an electric load remained in the filter capacitor 63 may affect the relays 111, 112, 114, 115 when the relays 111, 112, 114, 115 are switched to the on-state.

In this regard, as has been described above, the configuration of the present embodiment suppresses switching the relays 111, 112, 114, 115 to the on-state with the filter capacitor 63 charged. As a result, for example, it is not necessary to reduce the capacitance of the filter capacitor 63 in order to reduce an effect on the relays 111, 112, 114, 115 when the relays 111, 112, 114, 115 are in the on-state. Therefore, the capacitance of the filter capacitor 63 may be set freely without considering the effect on the relays 111, 112, 114, 115, the noise may be reduced suitably, and the high DC electric power P1 may be stabilized.

(4) The vehicle electric compressor 10 as the vehicle fluid machine includes the vehicle electric motor 11 and the vehicle inverter device 30. Accordingly, the above-described effect (1) may be obtained in the vehicle electric compressor 10.

The above-described embodiment may be modified as follows.

The driver circuit 71 and the compressor ECU 72 may be configured to maintain the on-states of the lower arm switching elements Qu2, Qv2, Qw2 even when the high DC electric power P1 is inputted to the input terminals 31, 32.

The specific configuration of the filter circuit 60 may be changed arbitrarily, and for example, the normal mode coil 62 or the common mode coil 61 may be omitted. The normal mode coil 62 may be formed on both of the positive bus bar 41 and the negative bus bar 42.

The normal mode coil 62 may be configured by a dedicated coil or a parasitic inductance by a wire or other elements.

The filter circuit 60 may include a plurality of filter capacitors. For example, the filter circuit 60 may have a Y capacitor, in addition to the filter capacitor 63 as the X capacitor.

The inverter circuit 50 is not limited to the three-phase inverter circuit, but may be a two-phase inverter circuit.

The smoothing capacitor 113 may be omitted,

Although the relays 111, 112, 114, 115 are disposed outside the vehicle inverter device 30 in the above embodiment, the present disclosure is not limited to this configuration. The relays 111, 112, 114, 115 may be disposed in the vehicle inverter device 30.

The number of relays, the connection between the relays, the connection between the relays and the smoothing capacitor 113 may be changed arbitrarily. In other words, the configuration to connect the power storage device 104 and the input terminals 31, 32 via the relays (e.g., the number of relays and the connection of those members) may be change arbitrarily.

For example, the main relays 111,112 may be omitted. For example, one or more relays to be connected to the first main relay 111 or the second main relay 112 may be provided while omitting the sub-relays 114, 115. Even in this case, depending on the connection of the relays and an order of switching the relays to the on-state, operations of the relays may be hindered by switching the relays to be on-state with the filter capacitor 63 charged.

The vehicle electric compressor 10 is not limited to be used in the vehicle air conditioner 101, and may be used in a device other than the vehicle electric compressor 10. For example, when the vehicle 100 is a fuel cell vehicle, the vehicle electric compressor 10 may be used in an air supply device that supplies air to fuel cells. That is, fluid to be compressed by the vehicle electric compressor 10 is not limited to the refrigerant, and may be air, or the like.

The vehicle fluid machine is not limited to the vehicle electric compressor 10 including the compression part 12 that compresses fluid. For example, when the vehicle 100 is a fuel cell vehicle, the vehicle fluid machine may be an electric pump device including a pump that supplies hydrogen to fuel cells and a vehicle electric motor that drives the pump.

The vehicle electric motor 11 is not limited to a motor used in the vehicle electric compressor 10, and may be any motor, as long as the motor is mounted on a vehicle. For example, the vehicle electric motor 11 is a motor for causing a vehicle to travel.

The following will describe a preferable example grasped from the above describe embodiment and modifications.

A vehicle inverter device preferably includes a first input terminal and a second input terminal as the input terminal, a positive bus bar connected to the first input terminal, a negative bas bar connected to the second input terminal, and an upper arm freewheeling diode connected in parallel with the upper arm switching element, wherein the upper arm switching element is connected to the positive bus bar and the lower arm switching element is connected to the negative bus bar, the upper arm freewheeling diode a cathode connected to the positive bus bar and an anode connected to the connection line, and the capacitor of the filter circuit is connected to the positive bus bar and the negative bus bar.

What is claimed is:

1. A vehicle inverter device for driving a vehicle electric motor using a vehicle electric power source, the vehicle inverter device comprising:

an input terminal connected to the vehicle electric power source via a relay;

a filter circuit configured to reduce a noise contained in a direct current electric power inputted from the input terminal, and including a capacitor;

an inverter circuit including an upper arm switching element and a lower arm switching element connected in series to each other through a connection line, and configured to convert the direct current electric power inputted from the filter circuit to an alternating current electric power;

a positive bus bar electrically connecting the input terminal, the capacitor, and the upper arm switching element;

a negative bus bar electrically connecting the input terminal, the capacitor, and the lower arm switching element;

a control circuit configured to control the upper arm switching element and the lower arm switching element;

an upper arm ground line connecting the control circuit and the connection line; and a low-voltage electric power source circuit configured to supply the direct current electric power to the control circuit, not though the relay and the input terminal, wherein the control circuit causes only the lower arm switching element to be in an on-state and electrically connects the control circuit and the negative bus bar through the upper arm ground line when the direct current electric power is supplied from the low-voltage electric power source circuit under a condition where the direct current electric power is not inputted to the input terminal.

2. The vehicle inverter device according to claim 1, wherein the control circuit causes the lower arm switching element to be switched from the on-state to an off-state in response to input of the direct current electric power to the input terminal.

3. The vehicle inverter device according to claim 1, wherein the filter circuit includes a coil, and the filter circuit has a low pass filter circuit including the coil and the capacitor.

4. The vehicle inverter device according to claim 1, further comprising:

an upper arm freewheeling diode connected in parallel with the upper arm switching element, wherein the input terminal includes a first input terminal and a second terminal, the positive bus bar is connected to the first input terminal, the negative bus bar is connected to the second input terminal, the upper arm switching element is connected to the positive bus bar and the lower arm switching element is connected to the negative bus bar, and the upper arm freewheeling diode has a cathode connected to the positive bus bar, and an anode connected to the connection line.

5. A vehicle fluid machine comprising:

the vehicle electric motor; and the vehicle inverter device according to claim 1.

6. The vehicle fluid machine according to claim 5, wherein the vehicle fluid machine is a vehicle electric compressor driven by the vehicle electric motor.

* * * * *